United States Patent
Isoyama et al.

(10) Patent No.: US 8,084,536 B2
(45) Date of Patent: Dec. 27, 2011

(54) RESIN COMPOSITION AND FILM MADE OF SAME

(75) Inventors: Kouta Isoyama, Kurashiki (JP);
Hiroyuki Shindome, Kurashiki (JP);
Naoki Kataoka, Kurashiki (JP);
Tomoyuki Watanabe, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 478 days.

(21) Appl. No.: 11/813,840

(22) PCT Filed: Jan. 11, 2006

(86) PCT No.: PCT/JP2006/300177
§ 371 (c)(1),
(2), (4) Date: Jul. 12, 2007

(87) PCT Pub. No.: WO2006/075591
PCT Pub. Date: Jul. 20, 2006

(65) Prior Publication Data
US 2009/0012236 A1    Jan. 8, 2009

(30) Foreign Application Priority Data
Jan. 12, 2005    (JP) .................................. 2005-004836

(51) Int. Cl.
*C08L 29/04*    (2006.01)
(52) U.S. Cl. ........ 525/57; 428/34.1; 428/34.3; 428/515; 428/516; 428/517; 428/519; 428/521; 525/61
(58) Field of Classification Search .................. 428/34.1, 428/34.3, 515, 516, 517, 519, 521; 525/57, 525/61
See application file for complete search history.

(56) References Cited

U.S. PATENT DOCUMENTS

| | | | | |
|---|---|---|---|---|
| 2,434,179 A | * | 1/1948 | Sharkey | 525/60 |
| 5,466,748 A | * | 11/1995 | Ikeda et al. | 525/57 |
| 5,571,871 A | * | 11/1996 | Ikeda et al. | 525/337 |
| 5,741,870 A | * | 4/1998 | Ikeda et al. | 526/198 |
| 6,533,964 B1 | * | 3/2003 | Hata et al. | 252/511 |
| 7,354,654 B2 | * | 4/2008 | Masuda et al. | 428/515 |
| 2004/0089388 A1 | | 5/2004 | Fujino et al. | |
| 2004/0096683 A1 | | 5/2004 | Ikeda et al. | |
| 2005/0027053 A1 | | 2/2005 | Uchiumi et al. | |
| 2005/0147778 A1 | | 7/2005 | Tai et al. | |

FOREIGN PATENT DOCUMENTS

| | | |
|---|---|---|
| JP | 6 340783 | 12/1994 |
| JP | 0 8-081569 | * 3/1996 |
| JP | 2004 161874 | 6/2004 |
| JP | 2004 269725 | 9/2004 |
| JP | 2004-292677 | * 10/2004 |
| WO | 02 060961 | 8/2002 |
| WO | 02 092643 | 11/2002 |
| WO | 03 072653 | 9/2003 |

OTHER PUBLICATIONS

U.S. Appl. No. 11/587,981, filed Oct. 30, 2006, Hayashi, et al.
U.S. Appl. No. 12/094,020, filed May 16, 2008, Murata, et al.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

A resin composition is provided which comprises from 50 to 95% by weight of a modified ethylene-vinyl alcohol copolymer (C) obtained by reacting an ethylene-vinyl alcohol copolymer (A) with a monovalent epoxy compound (B) having a molecular weight of 500 or less, and from 5 to 50% by weight of a soft resin (F) that has at least one functional group able to react with a hydroxyl group and has a Young's modulus at 23° C., 50% RH of 500 MPa or less, wherein the soft resin (F) is dispersed with an average particle diameter of 0.1 µm or less in a matrix of the modified ethylene-vinyl alcohol copolymer (C). This resin composition is excellent in barrier properties and also in flex resistance and impact resistance at low temperature.

24 Claims, 1 Drawing Sheet

RESIN COMPOSITION AND FILM MADE OF SAME

TECHNICAL FIELD

The present invention relates to resin compositions comprising modified ethylene-vinyl alcohol copolymers and soft resins and to films comprising the same.

BACKGROUND ART

An ethylene-vinyl alcohol copolymer, which henceforth may be abbreviated as EVOH, is a resin excellent in gas barrier properties, but it cannot be used for some applications due to its insufficient flexibility. Therefore, improvement in flexibility has been attempted through modification of EVOH or blending of soft resins to EVOH.

Patent Reference 1 discloses a resin composition comprising EVOH and a thermoplastic resin having a boronic acid group or a boron-containing group capable of being converted into a boronic acid group in the presence of water. As such a thermoplastic resin having a boron-containing group, soft resins such as an ethylene-propylene copolymer and a hydrogenated styrene-isoprene-styrene block copolymer are also used. It is disclosed that incorporation of such soft resins improves the impact resistance of EVOH. However, the flex resistance and impact resistance at low temperature are still insufficient and therefore in some cases such products cannot be used in applications where flexing or impact is applied at low temperature.

Patent Reference 2 discloses a modified EVOH comprising 0.3 to 40 mol % of structural unit (I) shown below and having an ethylene content of 5 to 55 mol %. This modified EVOH is superior in barrier properties, transparency, stretchability, flexibility and flex resistance and is used in the form of a monolayer or multilayer structure for various types of molded articles.

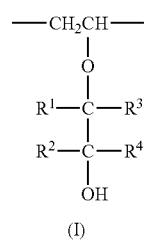

[Chem. 1]

(I)

wherein $R^1$, $R^2$, $R^3$ and $R^4$ denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ; $R^3$ and $R^4$ may be combined together; and $R^1$, $R^2$, $R^3$ and $R^4$ may have a hydroxyl group, a carboxyl group or a halogen atom.

Furthermore, Patent Reference 3 discloses a resin composition comprising the modified EVOH disclosed in Patent Reference 2 and another thermoplastic resin. Examples in which various thermoplastic resins are used as the another thermoplastic resin are disclosed. It is disclosed that a compatibilizer is preferably used in addition when polyolefin or polystyrene is used as the another thermoplastic resin. Substances modified with maleic anhydride or substances having boronic acid (ester) groups introduced are disclosed as examples of such a compatibilizer. In working examples, examples where EVOH and polyolefin are blended by using a VLDPE or hydrogenated styrene-butadiene-styrene block copolymer modified with a boronic acid ester as a compatibilizer are disclosed. However, the flex resistance and impact resistance at low temperature were insufficient.

In addition, Patent Reference 3 also discloses a resin composition obtained by mixing a modified EVOH disclosed in Patent Reference 2, a crosslinking agent and an elastomer having a functional group which can react with the crosslinking agent under melting conditions, thereby conducting dynamic crosslinking treatment. As such an elastomer, a hydrogenated product of a styrene-butadiene-styrene block copolymer modified with maleic anhydride and a hydrogenated product of a styrene-butadiene-styrene block copolymer having boronic acid ester groups are disclosed. When, however, dynamically crosslinking it while kneading, it is impossible to make dispersed particles small enough and, as a result, the flex resistance and impact resistance at low temperature are insufficient.

Patent Reference 1: JP 06-340783 A
Patent Reference 2: WO 02/092643 A1
Patent Reference 3: WO 03/072653 A1

DISCLOSURE OF THE INVENTION

Problems to be Solved by the Invention

The present invention was made in order to solve the problems mentioned above. An object of the present invention is to provide resin compositions excellent in barrier properties and also in flex resistance and impact resistance at low temperature.

Means for Solving the Problems

The above-mentioned problem is solved by providing a resin composition comprising from 50 to 95% by weight of a modified ethylene-vinyl alcohol copolymer (C) that contains from 0.3 to 40 mol % of a structural unit (I) provided below and has an ethylene content of from 5 to 55 mol %, a from 5 to 50% by weight of a soft resin (F) that has at least one functional group able to react with a hydroxyl group and has a Young's modulus at 23° C., 50% RH of 500 MPa or less, wherein the soft resin (F) is dispersed with an average particle diameter of 0.1 μm or less in a matrix of the modified ethylene-vinyl alcohol copolymer (C):

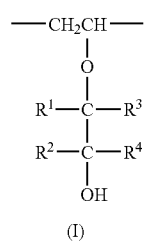

[Chem. 2]

(I)

wherein $R^1$, $R^2$, $R^3$ and $R^4$ denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ; $R^3$ and $R^4$ may be combined together; and $R^1$, $R^2$, $R^3$ and $R^4$ may have a hydroxyl group, a carboxyl group or a halogen atom.

In the resin composition, it is desirable that the tensile elongation at yield measured in a tensile strength/elongation measurement at 0° C. is from 8 to 30%. It is also desirable that the Izod impact strength at −40° C. of the resin composition measured in accordance with ASTM D265 is from 25 to 60 kJ/m².

The above-mentioned problem is also solved by providing a resin composition comprising from 50 to 95% by weight of a modified ethylene-vinyl alcohol copolymer (C) obtained by reacting an ethylene-vinyl alcohol copolymer (A) with a monovalent epoxy compound (B) having a molecular weight of 500 or less, and from 5 to 50% by weight of a soft resin (F) that has at least one functional group able to react with a hydroxyl group and has a Young's modulus at 23° C., 50% RH of 500 MPa or less, wherein the soft resin (F) is dispersed with an average particle diameter of 0.1 μm or less in a matrix of the modified ethylene-vinyl alcohol copolymer (C).

In any one of the resin compositions, it is desirable that the soft resin (F) is one modified with maleic acid or maleic anhydride, or one having a boronic acid group or a boron-containing group capable of being converted into a boronic acid group in the presence of water. It is also desirable that the soft resin (F) is a styrene-diene block copolymer or a hydrogenated product thereof, or an olefin-based copolymer.

Preferred embodiments of the present invention are films comprising the above-mentioned resin compositions. A particularly preferred embodiment is a multilayer film, wherein a film of an elastomer is laminated on at least one side of such a film. Such a multilayer film is preferably used for a flexible container.

EFFECT OF THE INVENTION

Resin compositions of the present invention are excellent in barrier properties and also in flex resistance and impact resistance at low temperature. They therefore can be used suitably as films and can be used suitably for flexible containers or the like which can be used at low temperature.

BEST MODE FOR CARRYING OUT THE INVENTION

Figure 1:
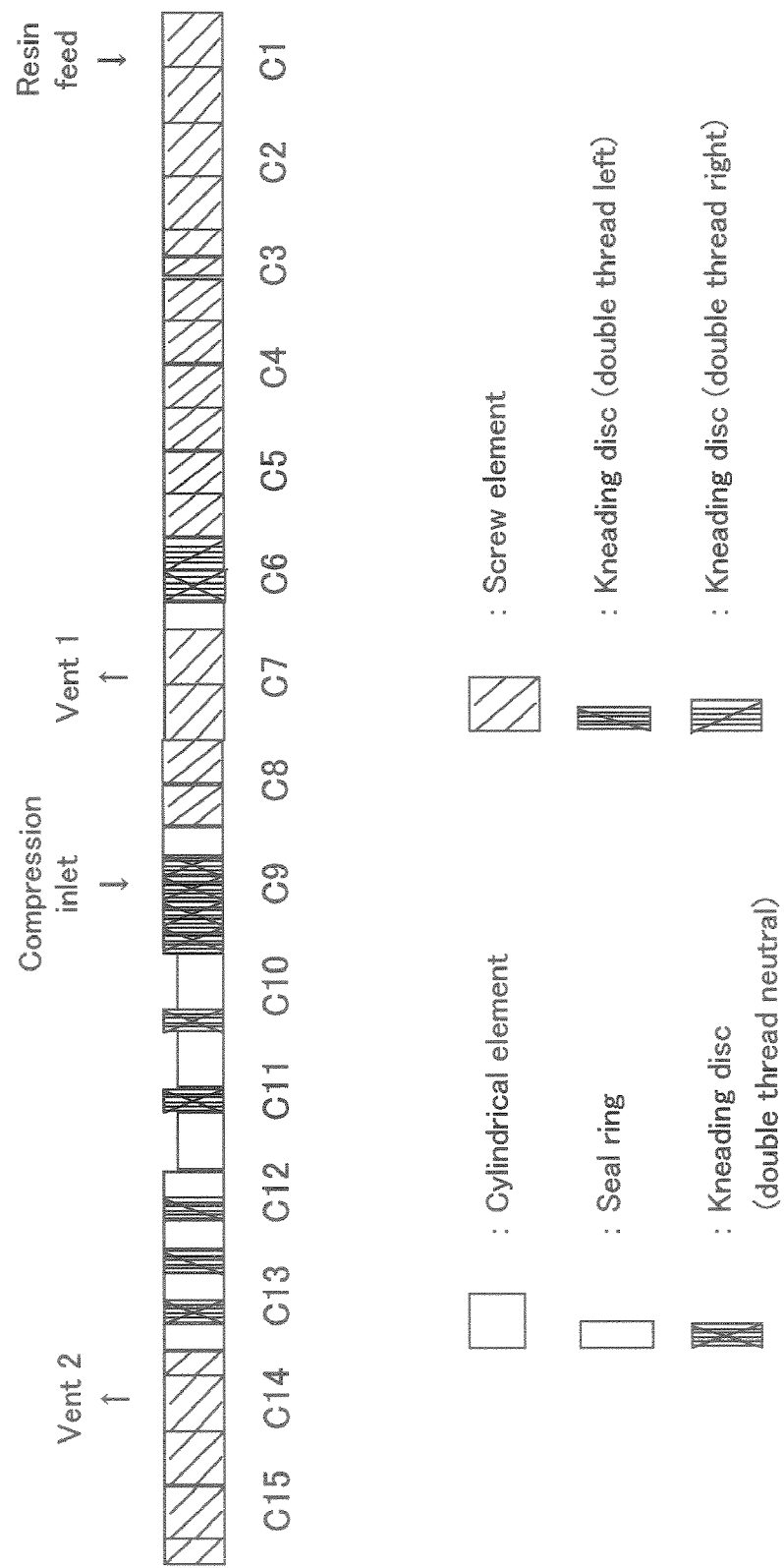
[FIG. 1] A schematic view of the constitution of the extruder used for the production of a modified EVOH (C) in Synthesis Examples 1, 5, 6 and 7.

The resin compositions of the present invention is a resin composition comprising from 50 to 95% by weight of a modified ethylene-vinyl alcohol copolymer (C) that contains from 0.3 to 40 mol % of a structural unit (I) provided below and has an ethylene content of from 5 to 55 mol %, and from 5 to 50% by weight of a soft resin (F) that has at least one functional group able to react with a hydroxyl group, wherein the soft resin (F) is dispersed with an average particle diameter of 0.1 μm or less in a matrix of the modified ethylene-vinyl alcohol copolymer (C):

[Chem. 3]

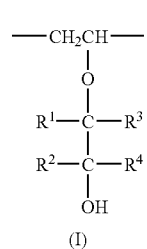

(I)

wherein $R^1$, $R^2$, $R^3$ and $R^4$ denote a hydrogen atom, an aliphatic hydrocarbon group having 1 to 10 carbon atoms (e.g., an alkyl group and an alkenyl group), an alicyclic hydrocarbon group having 3 to 10 carbon atoms (e.g., a cycloalkyl group and a cycloalkenyl group) and an aromatic hydrocarbon group having 6 to 10 carbon atoms (e.g., phenyl group); $R^1$, $R^2$, $R^3$ and $R^4$ may be the same group or may differ; $R^3$ and $R^4$ may be combined together, provided that the case where both $R^3$ and $R^4$ are hydrogen atoms is excluded; and $R^1$, $R^2$, $R^3$ and $R^4$ may have other groups, for example, a hydroxyl group, a carboxyl group and a halogen atom.

At this time, the number of carbon atoms in the aliphatic hydrocarbon groups is preferably 1 to 6, and more preferably 1 to 4. The number of carbon atoms in the alicyclic hydrocarbon groups is preferably 3 to 6, and more preferably 3 to 4. The number of carbon atoms in the aromatic hydrocarbon groups is preferably 6. The sum total of the numbers of carbon atoms of $R^1$, $R^2$, $R^3$ and $R^4$ is preferably 10 or less, and more preferably 6 or less.

The modified EVOH (C) used in the present invention is a modified ethylene-vinyl alcohol copolymer (C) having an ethylene content of 5 to 55 mol % and containing 0.3 to 40 mol % of the structural unit (I) shown above.

In a preferred embodiment, both $R^1$ and $R^2$ are hydrogen atoms. In a more preferable embodiment, both $R^1$ and $R^2$ are hydrogen atoms and one of $R^3$ and $R^4$ is an aliphatic hydrocarbon group having 1 to 10 carbon atoms and the other is a hydrogen atom. Preferably, the aliphatic hydrocarbon group is an alkyl group or an alkenyl group. From a viewpoint of attaching great importance to the gas barrier properties required when the modified EVOH (C) is used as a barrier material, it is more preferable that one of $R^3$ and $R^4$ is methyl group or ethyl group and the other is a hydrogen atom.

In addition, from a viewpoint of the gas barrier properties required when the modified EVOH (C) is used as a barrier material, it is also preferable that one of $R^3$ and $R^4$ is a substituent represented by $(CH_2)_iOH$, wherein i is an integer of 1 to 8, and the other is a hydrogen atom. When much importance is attached to the gas barrier properties as a barrier material, in the substituent represented by $(CH_2)_iOH$, i is preferably an integer of 1 to 4, more preferably 1 or 2, and even more preferably 1.

The amount of the structure unit (I) contained in the modified EVOH (C) must fall within the range of 0.3 to 40 mol %. The lower limit of the amount of the structure unit (I) is preferably not less than 0.5 mol %, more preferably not less than 1 mol %, and even more preferably not less than 2 mol %. On the other hand, the upper limit of the amount of the structure unit (I) is preferably not more than 35 mol %, more preferably not more than 30 mol %, and even more preferably not more than 25 mol %. A modified EVOH (C) excellent simultaneously in gas barrier properties, stretchability, flexibility and flex resistance can be obtained when the amount of the structure unit (I) contained therein falls within the range mentioned above.

It is preferable that the ethylene content in the modified EVOH (C) is 5 to 55 mol %. From a viewpoint where the modified EVOH (C) becomes good in stretchability, flexibility and flex resistance, the lower limit of the ethylene content of the modified EVOH (C) is more preferably not less than 10 mol %, even more preferably not less than 20 mol %, particularly preferably not less than 25 mol %, and furthermore preferably not less than 31 mol %. On the other hand, from a viewpoint of the gas barrier properties of the modified EVOH (C), the upper limit of the ethylene content of the modified EVOH (C) is more preferably not more than 50 mol %, and even more preferably not more than 45 mol %. When the ethylene content is less than 5 mol %, the melt moldability may become poor, whereas when it exceeds 55 mol %, the gas barrier properties may be insufficient.

The constituents of the modified EVOH (C) other than the aforementioned structure units (I) and ethylene units are mainly vinyl alcohol units. The vinyl alcohol units are usually vinyl alcohol units which had not reacted with monovalent epoxy compounds (B) contained in a starting EVOH (A). Unsaponified vinyl acetate units which may be contained in the EVOH (A) are usually contained in the modified EVOH (C) as they are. Measurement results of NMR and melting point showed that the modified EVOH (C) is a random copolymer which contains these constituents. Furthermore, other constituents may also be contained unless the object of the present invention is damaged.

A preferable melt flow rate (MFR) (measured at 190° C. under a load of 2160 g) of the modified EVOH (C) is 0.1 to 30 g/10 min, more preferably 0.3 to 25 g/10 min, and even more preferably 0.5 to 20 g/10 min. It is noted that when a melting point is about 190° C. or over 190° C., the measurements are carried out under 2160 g load at two or more temperature not lower than the melting point. The results are plotted, in a semilog graph, with reciprocals of absolute temperature as abscissa against logarithms of MFRs as ordinate and the MFR is represented by an extrapolation to 190° C.

The method for producing the modified EVOH (C) is not limited particularly. The method that the present inventors recommend is a method in which the modified EVOH (C) is obtained by reacting an ethylene-vinyl alcohol copolymer (A) with a monovalent epoxy compound (B) having a molecular weight of 500 or less.

The problem the present invention intends to solve is also achieved also by providing a resin composition comprising from 50 to 95% by weight of a modified ethylene-vinyl alcohol copolymer (C) obtained by reacting an ethylene-vinyl alcohol copolymer (A) with a monovalent epoxy compound (B) having a molecular weight of 500 or less, and from 5 to 50% by weight of a soft resin (F) that has at least one functional group able to react with a hydroxyl group, wherein the soft resin (F) is dispersed with an average particle diameter of 0.1 µm or less in a matrix of the modified ethylene-vinyl alcohol copolymer (C).

As the EVOH (A) for use in the present invention as a raw material of the modified EVOH (C), one obtained by saponifying an ethylene-vinyl ester copolymer is preferred. A typical vinyl ester used in the production of EVOH is vinyl acetate. However, other fatty acid vinyl esters (e.g., vinyl propionate and vinyl pivalate) may also be employed. Unless the object of the present invention is affected, it is also permitted to copolymerize other comonomers, for example, α-olefins such as propylene, butylene, isobutene, 4-methyl-1-pentene, 1-hexene and 1-octene; unsaturated carboxylic acids or esters thereof such as (meth)acrylic acid, methyl (meth)acrylate and ethyl(meth)acrylate; vinylsilane compounds such as vinyltrimethoxysilane; unsaturated sulfonic acids or salts thereof; alkylthiols; and vinylpyrrolidones such as N-vinylpyrrolidone.

When an EVOH resulting from copolymerization using a vinylsilane compound as a comonomer component is used as the EVOH (A), it is preferable that the EVOH contain the compound copolymerized in an amount of 0.0002 to 0.2 mol %. When the EVOH contains a vinylsilane compound as a comonomer component in an amount within that range, the consistency in melt viscosity between a substrate resin and the modified EVOH (C) may be improved during coextrusion, thereby enabling to produce homogeneous multilayer coextrusion film articles. In particular, when using a substrate resin with a high melt viscosity, it becomes easy to obtain homogeneous multilayer coextrusion film articles. The vinylsilane compound includes, for example, vinyltrimethoxysilane, vinyltriethoxysilane, vinyltri(β-methoxy-ethoxy)silane and γ-methacryloxypropylmethoxysilane. Among them, vinyltrimethoxysilane and vinyltriethoxysilane are preferably used.

The ethylene content of the EVOH (A) for use in the present invention is preferably 5 to 55 mol %. From a viewpoint where the modified EVOH (C) becomes superior in stretchability, flexibility and flex resistance, the lower limit of the ethylene content of the EVOH (A) is more preferably not less than 10 mol %, even more preferably not less than 20 mol %, particularly preferably not less than 25 mol %, and furthermore preferably not less than 31 mol %. On the other hand, from a viewpoint of the gas barrier properties of the modified EVOH (C), the upper limit of the ethylene content of the EVOH (A) is more preferably not more than 50 mol %, even more preferably not more than 45 mol %. When the ethylene content is less than 5 mol %, the melt moldability may become poor, whereas when it exceeds 55 mol %, the gas barrier properties may be insufficient. When the EVOH (A) for use in the invention comprises a mixture of two or more EVOHs of different ethylene contents, an average value calculated from the blend proportions in weight of the EVOHs shall be the ethylene content of the EVOH (A).

Furthermore, the degree of saponification of the vinyl ester component in the EVOH (A) for use in the present invention is preferably not less than 90%. The degree of saponification of the vinyl ester component is more preferably not less than 95%, even more preferably not less than 98%, and most suitably not less than 99%. A degree of saponification of less than 90% may result in deterioration of gas barrier properties, especially gas barrier properties at high humidity, as well as in an unsatisfactory thermostability which may result in easy formation of gels and pimples in mold articles. When the EVOH (A) comprises a mixture of two or more EVOHs of different degrees of saponification, an average value calculated from the blend proportions in weight of the EVOHs shall be the degree of saponification of the EVOH (A).

The ethylene content and the degree of saponification of the EVOH (A) can be determined by the nuclear magnetic resonance (NMR) method.

The EVOH (A) for use in the present invention preferably has an intrinsic viscosity of not less than 0.06 L/g. The intrinsic viscosity of the EVOH (A) is more preferably within the range of 0.07 to 0.2 L/g, even more preferably 0.075 to 0.15 L/g, and particularly preferably 0.080 to 0.12 L/g. If the intrinsic viscosity of the EVOH (A) is less than 0.06 L/g, the stretchability, flexibility and flex resistance may deteriorate. On the other hand, if the intrinsic viscosity of the EVOH (A) exceeds 0.2 L/g, gels and pimples may form easily in a molded article containing the modified EVOH (C).

A preferable melt flow rate (MFR) (measured at 190° C. under a load of 2160 g) of the EVOH (A) for use in the present invention is 0.1 to 30 g/10 min, more preferably 0.3 to 25 g/10 min, and even more preferably 0.5 to 20 g/10 min. It is noted that when a melting point is about 190° C. or over 190° C., the measurements are carried out under 2160 g load at two or more temperature not lower than the melting point. The results are plotted, in a semilog graph, with reciprocals of absolute temperature as abscissa against logarithms of MFRs as ordinate and the MFR is represented by an extrapolation to 190° C. Two or more EVOHs of different MFRs may be mixed and used.

The monovalent epoxy compound (B) having a molecular weight of 500 or less for use in the present invention must be a monovalent epoxy compound. In other words, it must be an epoxy compound which has only one epoxy group in its molecule. When a polyvalent epoxy compound that is divalent or higher valent is used, the effect of the present invention can not be obtained. It is to be noted that during the production of the monovalent epoxy compound, a very small amount of polyvalent epoxy compound may be contained. Unless the effect of the present invention is affected, a monovalent epoxy compound containing a very small amount of polyvalent epoxy compound can be used as the monovalent epoxy compound (B) having a molecular weight of 500 or less in the present invention.

The monovalent epoxy compound (B) having a molecular weight of 500 or less for use in the present invention is not limited particularly. Specifically, compounds represented by the following formula (III) through (IX) can be used suitably:

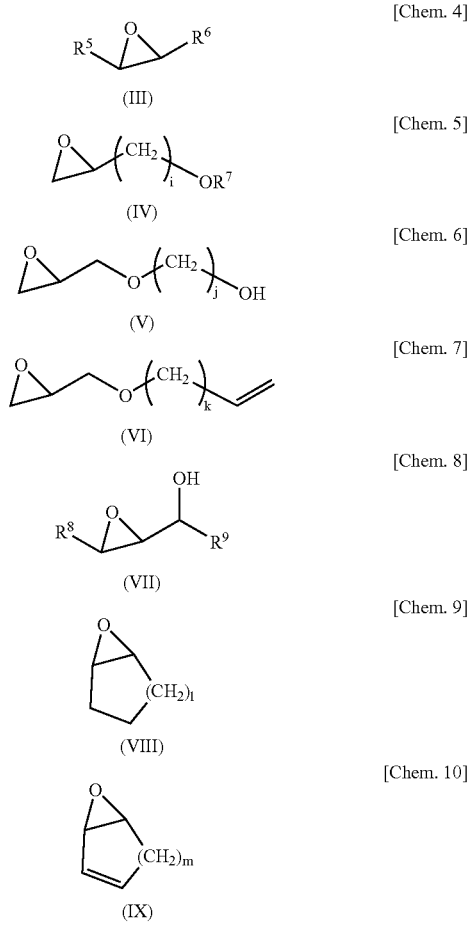

wherein $R^5$, $R^6$, $R^7$, $R^8$ and $R^9$ represent a hydrogen atom, an aliphatic hydrocarbon group having 1 to 10 carbon atoms (e.g., an alkyl group, an alkenyl group), an alicyclic hydrocarbon group having 3 to 10 carbon atoms (e.g., a cycloalkyl group, a cycloalkenyl group), and an aromatic hydrocarbon group having 6 to 10 carbon atoms (e.g., phenyl group); and i, j, k, l and m denote an integer of 1 to 8.

Among these monovalent epoxy compounds (B) having a molecular weight of 500 or less, epoxy compounds having 2 to 12 carbon atoms are preferred and epoxy compounds having 2 to 8 carbon atoms are particularly preferred as a monovalent epoxy compound (B) to be used in the present invention. The number of carbon atoms of the monovalent epoxy compound (B) is preferably 2 to 6, more preferably 2 to 4 from the viewpoints of easiness of the handling of a compound and reactivity with the EVOH (A). Moreover, it is preferable that the monovalent epoxy compound (B) is a compound represented by the formula (III) or (IV). From the viewpoints of the reactivity with EVOH (A) and the gas barrier properties of a modified EVOH (C) to be obtained, 1,2-epoxybutane, 2,3-epoxybutane, epoxypropane, epoxyethane and glycidol are particularly preferable. Among them, epoxypropane and gylcidol are preferable. In applications in which sanitariness is required, such as food packaging, drink packaging and drug packaging, it is desirable to use 1,2-epoxybutane, 2,3-epoxybutane, epoxypropane and epoxyethane as the monovalent epoxy compound (B). Particularly, it is preferable to use epoxypropane.

A modified EVOH (C) is obtained by reacting the EVOH (A) with the monovalent epoxy compound (B). At this time, a preferred mixing ratio of the EVOH (A) and the monovalent epoxy compound (B) is 1 to 50 parts by weight of the monovalent epoxy compound (B) to 100 parts by weight of the EVOH (A), more preferably 2 to 40 parts by weight of the monovalent epoxy compound (B) to 100 parts by weight of the EVOH (A), and particularly preferably 5 to 35 parts by weight of the monovalent epoxy compound (B) to 100 parts weight of the EVOH (A).

The method for producing the modified EVOH (C) by reacting the EVOH (A) with the monovalent epoxy compound (B) having a molecular weight of 500 or less is not limited particularly; examples of preferable methods include a production method in which the EVOH (A) and the monovalent epoxy compound (B) are reacted together in a solution, and a production method in which the EVOH (A) and the monovalent epoxy compound (B) are reacted together within an extruder. Among them, preferred is a production method in which the EVOH and the monovalent epoxy compound are melt kneaded to react in an extruder. It is also desirable to use a catalyst (D) containing a metal ion of Group III to XII in the periodic table or a catalyst deactivator (E) during the melt kneading for reaction. The production method of the modified EVOH (C) to be used in the present invention is described in detail in a pamphlet of International Publication No. WO 02/092643 (Patent Reference 2).

At least one substance selected from the group consisting of alkali metal salt, boron compound, carboxylic acid or its salt, phosphoric acid compound and alkaline earth metal salt may also be added to the modified EVOH (C) after the modified EVOH (C) is obtained through a reaction of the EVOH and the monovalent epoxy compound.

The modified EVOH (C) obtained in such a manner preferably has a melting point of 160° C. or lower. In such a case, it is possible to reduce the melting point difference from a resin having a low melting point such as polyolefin and thereby decrease the molding temperature used during melt molding of a resin composition. It is more preferably 150° C. or lower, and even more preferably 140° C. or lower.

A preferable melt flow rate (MFR) (measured at 190° C. under a load of 2160 g) of the modified EVOH (C) is 0.1 to 30 g/10 min, more preferably 0.3 to 25 g/10 min, and even more preferably 0.5 to 20 g/10 min. It is note that when a melting point is about 190° C. or over 190° C., the measurements are carried out under 2160 g load at two or more temperature not lower than the melting point. The results are plotted, in a semilog graph, with reciprocals of absolute temperature as abscissa against logarithms of MFRs as ordinate and the MFR is represented by an extrapolation to 190° C.

The modified EVOH (C) of the present invention preferably has an oxygen transmission rate at 20° C. and 65% RH of not more than 100 cc·20 μm/m²·day·atm. The upper limit of the oxygen transmission rate is more preferably not more than 50 cc·20 μm/m²·day·atm, and even more preferably not more than 20 cc·20 μm/m²·day·atm. The modified EVOH (C) of the present invention is suitably used as a barrier material even when it is mixed with a soft resin (F) and is particularly suitably used as a container for food packaging or the like because it is a resin having such a low oxygen transmission rate.

The modified EVOH (C) of the present invention preferably has a Young's modulus in a tensile strength/elongation measurement at 23° C., 50% RH of 1500 MPa or less. When the Young's modulus is 1500 MPa or less, it is possible to obtain a resin composition excellent in flex resistance and impact resistance at low temperature. The Young's modulus is more preferably 1300 MPa or less, and even more preferably 1200 MPa or less. On the other hand, the Young's modulus of a modified EVOH (C) can be adjusted by adjusting the amount of structural units (I), ethylene content, saponification degree, etc. of the modified EVOH (C). However, when the Young's modulus is adjusted to be reduced, the properties tend to decrease. Therefore, it is undesirable to reduce the Young's modulus very much from the standpoint of obtaining a modified EVOH (C) excellent in barrier properties. From this point of view, the Young's modulus of the modified EVOH (C) is preferably not less than 600 MPa, more preferably not less than 700 MPa and even more preferably not less than 800 MPa.

In the present invention, the soft resin (F) to be blended with the modified EVOH (C) is a soft resin (F) which has at least one functional group able to react with a hydroxyl group and has a Young's modulus at 23° C., 50% RH of 500 MPa or less. By choosing such a soft resin (F), is possible to disperse it very finely and also possible to exert excellent flex resistance and impact resistance at low temperature.

It is important that the Young's modulus of the soft resin (F) at 23° C., 50% RH is 500 MPa or less. This makes it possible to obtain a resin composition excellent in flex resistance and impact resistance at low temperature. When the Young's modulus is more than 500 MPa, improvement in low-temperature flex resistance and low-temperature impact resistance becomes insufficient. It is preferably not more than 300 MPa, more preferably not more than 200 MPa, and even more preferably not more than 100 MPa. On the other hand, the Young's modulus is preferably not less than 0.1 MPa. When the Young's modulus is less than 0.1 MPa, it becomes difficult to handle the soft resin (F) and it may become difficult to blend with a modified EVOH (C). It is preferably not less than 0.5 MPa, and more preferably not less than 1 MPa.

The base polymer which constitutes the soft resin (F) is not particularly restricted, and one preferable example thereof is thermoplastic elastomer. As the thermoplastic elastomer, styrene-based elastomers, polyurethane-based elastomers, polyester-based elastomers, polyether-based elastomers, etc. may be used. Among these, styrene-based elastomers, to which functional groups able to react with a hydroxyl group are easily introduced, are suitably used. Particularly, it is preferable to use a styrene-diene block copolymer or a hydrogenated product thereof.

When the soft resin (F) is a thermoplastic elastomer composed of a block copolymer, it is desirable that units constituting the soft segments thereof are of at least one species selected from ethylene, propylene, butadiene or its hydrogenated product, isoprene or its hydrogenated product. This results in improvement in flexibility of the soft resin (F) at low temperature and it is possible to obtain a resin composition excellent in resistance and impact resistance at low temperature. More suitably, the units are of at least one species selected from ethylene, butadiene or its hydrogenated product, isoprene or its hydrogenated product.

The styrene-diene block copolymer is a block copolymer containing at least one styrene block and at least one diene block. The diene block is preferably a hydrogenated diene block. This results in improvement in durability. Such a styrene-diene block copolymer includes a diblock copolymer, a triblock copolymer and a multiblock copolymers containing four or more blocks. Among these, it is preferably a triblock copolymer.

Examples of preferable styrene-diene block copolymers include styrene-butadiene-styrene block copolymers and hydrogenated products thereof, styrene-isoprene-styrene block copolymers and hydrogenated products thereof.

Other suitable base polymers constituting the soft resin (F) include olefin-based copolymers. This is because copolymerization leads to decrease in crystallinity and a soft resin having a low Young's modulus can be obtained easily. In this case, it preferably c ethylene as a main component. This results in improvement in flexibility of the soft resin (F) at low temperature and it is possible to obtain a resin composition extremely excellent in flex resistance and impact resistance at low temperature. Here, "to contain ethylene as a main component" means that ethylene occupies more than half on weight basis.

Examples of preferable olefin-based copolymers include ethylene-propylene copolymers, VLDPE and linear low density polyethylene (LLDPE) or the like. In the case of one containing ethylene as a main component, one having a density of 0.88 to 0.94 g/cm³ is preferably employed. The lower limit of density is more preferably 0.89 g/cm³. The upper limit of density is more preferably 0.92 g/cm³ or less, even more preferably 0.91 g/cm³ or less, and particularly preferably 0.90 g/cm³ or less.

The soft resin of the present invention has at least one functional group able to react with a hydroxyl group. Examples of the "at least one functional group able to react with a hydroxyl group" referred to herein include a carboxyl group (including groups composed of carboxylic anhydride), an epoxy group and boron-containing groups or the like. It has heretofore been known that EVOH and a resin having such functional groups are well compatible. In such cases, however, the diameter of dispersed particles is far larger than 0.1 μm. In the present invention, by mixing with a modified EVOH (C) instead of an unmodified EVOH, a resin composition in which it is dispersed with an extremely fine average particle diameter as small as 0.1 μm or less could be surprisingly obtained. From the viewpoint of reactivity or compatibility with a modified EVOH (C), one modified with maleic acid or maleic anhydride, or one having a boronic acid group or a boron-containing group capable of being converted into a boronic acid group in the presence of water is preferred.

The boronic acid group is a group represented by the following formula (XI):

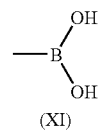

[Chem. 11]

(XI)

The boron-containing group capable of being converted into a boronic acid group in the presence of water indicates a boron-containing group that can be hydrolyzed in the presence of water to be converted into a boronic acid group represented by the above formula (XI). More specifically, the boron-containing group capable of being converted into a boronic acid group in the presence of water means a functional group that can be converted into a boronic acid group when being hydrolyzed under conditions of from room temperature to 150° C. for from 10 minutes to 2 hours by use, as a solvent, of water only, a mixture of water and an organic solvent (e.g., toluene, xylene and acetone), a mixture of a 5% aqueous boric acid solution and the above described organic solvent, or the like. Representative examples of such functional groups include boronic acid ester groups represented by the following formula (XII), boronic anhydride groups represented by the following formula (XIII), and boronic acid salt groups represented by the following formula (XIV):

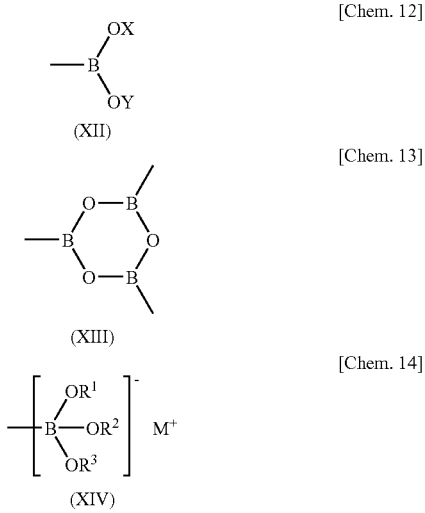

[Chem. 12]

(XII)

[Chem. 13]

(XIII)

[Chem. 14]

(XIV)

{wherein X and Y represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group and a cycloalkenyl group), or an aromatic hydrocarbon group (e.g., phenyl group and biphenyl group); X and Y may be the same or different; however the case where both X and Y are hydrogen atoms is excluded, and X and Y may be bonded to each other; $R^1$, $R^2$ and $R^3$ represent a hydrogen atom, an aliphatic hydrocarbon group, an alicyclic hydrocarbon group or an aromatic hydrocarbon group, like X and Y, and $R^1$, $R^2$ and $R^3$ may be the same or different; M represents an alkali metal; and the groups X, Y, $R^1$, $R^2$ and $R^3$ may have any other groups such as a hydroxyl group, a carboxyl group, a halogen atom, etc.}

Specific examples of the boronic acid ester group represented by general formula (XII) include dimethyl boronate group, diethyl boronate group, dibutyl boronate group, dicyclohexyl boronate group, ethylene glycol boronate group, propylene glycol boronate group, 1,3-propanediol boronate group, 1,3-butanediol boronate group, neopentyl glycol boronate group, catechol boronate group, glycerin boronate group, trimethylolethane boronate group, trimethylolpropane boronate group, diethanolamine boronate group, etc.

The boronic acid salt groups represented by the general formula (XIV) may be alkali metal salt groups of boronic acid, etc. Specific examples include sodium boronate group and potassium boronate group, etc.

Among such boron-containing functional groups, cyclic boronate groups are preferred in view of thermal stability. Examples of cyclic boronate groups include 5-membered or 6-membered ring-containing cyclic boronate groups. Specific examples include ethylene glycol boronate group, propylene glycol boronate group, 1,3-propanediol boronate group, 1,3-butanediol boronate group and glycerin boronate group, etc.

The soft resin (F) of the present invention may contain only one kind of or two or more kinds of boron-containing functional groups. Such boron-containing functional groups may be introduced to either a side chain or an end of a base polymer.

When a boron-containing functional group is introduced to a side chain, the amount of the boron-containing functional groups contained in the soft resin (F) is preferably from 0.0001 to 0.002 equivalents per gram of the soft resin (F), namely from 100 to 2000 µeq/g (µmol/g), and more preferably from 150 to 1500 µeq/g. When the amount of the functional groups is less than 100 µeq/g, the dispersibility of the soft resin (F) may become insufficient. When the amount of the functional groups exceeds 2000 µeq/g, gelation may become easy to occur.

On the other hand, when boron-containing functional groups are introduced to ends, a resin composition in which a soft resin (F) is finely dispersed is obtained even if the amount of the functional groups is smaller than that in the case of being introduced to side chains. The amount of the boron-containing functional groups contained in the soft resin (F) is preferably from 0.00002 to 0.0005 equivalents per gram of the soft resin (F), namely from 20 to 500 µeq/g, and more preferably from 30 to 300 µeq/g. When the amount of the functional groups is less than 20 µeq/g, the dispersibility of the soft resin (F) may become insufficient. When introducing to ends, it is difficult to introduce functional groups in an amount more than 500 µeq/g.

As a method for introducing such boron-containing groups, methods disclosed in JP 06-340783 A (Patent Reference 1) may be used. A representative production method is as follows. First, a boron compound having a boron-hydrogen bond typified by boran complex and a boronic acid ester typified by trialkyl borate are caused to react with a polymer having an olefinic double bond in its main chain and/or side chain to produce a polymer having a dialkyl boronate group and then, if necessary, causing water or alcohol to react. In this way, a boron-containing functional group is introduced to the olefinic double bond of the polymer by addition reaction. In this step, it is preferable to carry out the reaction while conducting melt kneading by using an extruder or the like.

Products modified with maleic acid or maleic anhydride are produced by graft polymerizing maleic acid (or maleic anhydride) to a polymer, adding maleic acid (or maleic anhydride) to a polymer utilizing a Diels-Alder reaction, or copolymerizing maleic acid (or maleic anhydride) with other monomers.

The content of the constitutional units originating in maleic anhydride or maleic acid is preferably 0.0001 to 0.002 equivalents per gram of a soft resin (F), namely 100 to 2000 µeq/g (µmol), and more preferably 150 to 1500 µeq/g. When the amount of the functional groups is less than 100 µeq/g, the dispersibility of the soft resin (F) may become insufficient. When the amount of the functional groups exceeds 2000 µeq/g, gelation may become easy to occur.

The resin composition of the present invention comprises 50 to 95% by weight of a modified EVOH (C) and 5 to 50% by weight of a soft resin (F). By inclusion of 50% by weight or more of the modified EVOH (C), it becomes easy to form a morphology comprising the modified EVOH (C) as a matrix and the soft resin (F) as a domain and a resin composition with good barrier properties is obtained. The content of the modified EVOH (C) is preferably 60% by weight or more, and more preferably 70% by weight or more. At this time, the content of the soft resin (F) is preferably 40% by weight or less, and more preferably 30% by weight or less. On the other hand, by inclusion of 5% by weight or more of the soft resin (F), it is possible to obtain a resin composition having good flex resistance or impact resistance at low temperature. The content of the soft resin (F) is preferably not less than 10% by weight, and more preferably not less than 15% by weight. At this time, the content of the modified EVOH (C) is preferably not more than 90% by weight, and more preferably not more than 85% by weight.

To the resin composition of the present invention, various additives such as antioxidant, color agent, UV absorber, slipping agent, antistatic agent, plasticizer, crosslinking agent such as boric acid, inorganic filler and inorganic desiccant, and various resin such as superabsorbent polymer may be incorporated unless the effect obtained by the present invention is affected.

Examples of blending means for obtaining the resin composition of the present invention by melt kneading the modified EVOH (C) and the soft resin (F) include a ribbon blender, a high-speed mixer, a co-kneader, pelletizer, mixing rolls, an extruder and an intensive mixer. Also among these, the melt kneading method which uses a single spindle or a twin screw extruder (the same direction or the different direction), an intensive mixer, a continuous system intensive mixer, etc. from the convenience of a process and a viewpoint of cost is preferred. The kneading temperature is chosen appropriately depending upon the characteristics of the facility, the molecular weights and blending proportions of the resins, etc. In many cases, it is preferably within the range of from 150 to 300° C. In order to prevent oxidization of a resulting resin composition, it is preferable that the hopper port is sealed with a nitrogen gas and that the extrusion be conducted at low temperature. A longer kneading time will lead to a better result, but a kneading time of from 0.1 to 20 minutes is preferable in view of prevention of oxidization of a resin composition and production efficiency.

The resin composition obtained in such a way is one in which the soft resin (F) is dispersed with an average particle diameter of 0.1 μm or less in a matrix of the modified EVOH (C). By melt kneading the modified EVOH (C) and the soft resin (F) in combination, it became possible to disperse it with a surprisingly fine particle diameter. As shown in the Examples disclosed below, use of a styrene-hydrogenated butadiene-styrene block copolymer having no functional groups able to react with a hydroxyl group instead of the soft resin (F) (Comparative Example 3) results in a large average particle diameter as large as 5 μm. Use of an unmodified EVOH instead of the modified EVOH (C) (Comparative Examples 1 and 2) also results in average particle diameters as larger as 0.2 μm or more. The occurrence of such a great difference in dispersibility is surprising because the modified EVOH (C) and the unmodified EVOH are almost the same with respect to the number of hydroxyl groups contained therein. The fact that part of the hydroxyl groups contained in the modified EVOH (C) are primary hydroxyl groups while all hydroxyl groups contained in the unmodified EVOH are secondary hydroxyl groups is considered to probably have an effect on the reactivity with functional groups contained in the soft resin (F).

It is desirable that the tensile elongation at yield of the resin composition of the present invention measured in a tensile strength/elongation measurement at 0° C. is from 8 to 30%. Many resins with excellent barrier properties including EVOH are hard and, in many cases, they can not be used for applications where flex is repeated. In order to improve the resistance to repeated flex, what is required is a property that when deformation is produced on application of a load, the original shape is restored rapidly after the removal of the load. One of the measures for evaluating this is a tensile elongation at yield. In a case of deformation up to the elongation, the original shape can be restored elastically; in a case of deformation greater than that, permanent strain or defect will remain. Therefore, a resin having a tensile elongation at yield as great as possible is desired. However, resins having large tensile elongations at yield like many elastomers have insufficient barrier properties in many cases.

The resin composition of the present invention can have a surprisingly great tensile elongation at yield while having excellent barrier properties. The reason for this is not necessarily clear, but it is assumed that the fact that the soft resin (F) is dispersed to form extremely fine particles and increase in interfacial adhesive strength resulting from reaction between primary hydroxyl groups in the modified EVOH (C) and functional groups contained in the soft resin (F) contribute thereto. It may also be considered that this makes the force dispersed well in the resin composition and therefore micro fracture is difficult to occur in particle boundaries even when a resin composition receives a great deformation and, as the result, such a great tensile elongation at yield was obtained.

When the tensile elongation at yield in the tensile strength/elongation measurement at 0° C. is less than 8%, the flex resistance at low temperature may deteriorate. The tensile elongation at yield is more preferably not less than 10%, and even more preferably not less than 12%. On the other hand, when the tensile elongation at yield is more than 30%, barrier properties may deteriorate. The tensile elongation at yield is more preferably not more than 27%, and even more preferably not more than 24%. The tensile strength/elongation measurement is conducted by the method disclosed in the Examples disclosed below.

It is desirable that the Izod impact strength at −40° C. of the resin composition of the present invention measured in accordance with ASTM D265 is from 25 to 60 kJ/m². Heretofore, many barrier materials were insufficient in impact resistance, particularly, impact resistance at low temperature. The resin composition of the present invention, however, can have great Izod impact strength at low temperature while having excellent barrier properties. The reason for this is not clear, but it may be considered that, like the tensile elongation at yield, the dispersibility of the soft resin (F), the reactivity between hydroxyl groups of the modified EVOH (C) and functional groups of the soft resin (F), and the like have some influences.

When the Izod impact strength at −40° C. is less than 25 kJ/m², the impact resistance at low temperature may deteriorate. The Izod impact strength is more preferably not less than 28 kJ/m², and even more preferably not less than 30 kJ/m². On the other hand, when the Izod impact strength is more than 60 kJ/m², barrier properties may deteriorate. The Izod impact strength is more preferably not more than 50 kJ/m², and even more preferably not more than 45 kJ/m². The Izod impact strength is measured by the method disclosed in the Examples below in accordance with ASTM D265.

The resin composition of the present invention preferably has an oxygen transmission at 20° C. and 65% RH of not more than 100 cc·20 μm/m²·day·atm. By having an oxygen transmission rate within such a range, it can be used for many applications where barrier properties are required. Particularly in applications where flex resistance is required, it is often used in the form of film. It is therefore desired to be able to exert good barrier properties even if it is in the form of thin film. For this reason, the oxygen transmission rate is more preferably not more than 50 cc·20 μm/m²·day·atm, and even more preferably not more than 30 cc·20 μm/m²·day·atm. On the other hand, when the oxygen transmission rate is too low, the flex resistance or impact resistance at low temperature tends to be insufficient. It is therefore preferably not less than 1 cc·20 μm/m²·day·atm, and more preferably not less than 5 cc·20 μm/m²·day·atm.

The resin composition of the present invention is molded preferably by melt molding into various types of molded articles such as films, sheets, containers, pipes, hoses and fibers. It is also possible to pulverize and reshape such molded articles for the purpose of reuse. In addition, films, sheets, fibers and the like may be drawn uniaxially or biaxially. As a method of melt molding, available are extrusion molding, melt spinning, injection molding, injection blow molding and the like. The melting temperature is preferably from about 120 to 270° C.

In particular, the resin composition of the present invention is preferably used in the form of film. It has good gas barrier properties and also is excellent in flex resistance at low temperature. It can be therefore used suitably for films, which are often flexed. The thickness of such films is not particularly limited, but it is typically from 5 to 300 μm. When the thickness is more than 300 μm, it may be difficult to use it for applications where flex resistance is required. Therefore the thickness is preferably not more than 100 μm, more preferably not more than 50 μm, and even more preferably not more than 30 μm. On the other hand, when the thickness is less than 5 μm, it becomes difficult to produce films and barrier properties tend to become insufficient. Therefore, the thickness is desirably 10 μm or more.

The resin composition of the present invention can also be used as a multilayer structure containing at least one layer thereof. In this case, the material of each layer to be laminated is not particularly restricted. For example, thermoplastic resin such as polyolefin, polyamide, polyester, polystyrene, polyvinylidene chloride, polyvinyl chloride, polyacrylonitrile, polycarbonate and thermoplastic polyurethane, aluminum foil and paper may be laminated. When water resistance or moisture proofing property is required, it is desirable to be laminated with polyolefin, polyester, polystyrene, etc. When heat sealability is required, it is desirable to be laminated with a polyolefin.

Among such multilayer structures, a multilayer film in which a film made of the resin composition of the present invention and a film made of another resin are laminated is a particularly preferable embodiment of the present invention. In particular, when a high level of flex resistance is required, it is preferable to laminate the resin composition of the present invention with an elastomer. The resin composition of the present invention, a striking feature of which is having a great tensile elongation at yield at low temperature as mentioned previously, is laminated with an elastomer having a greater tensile elongation at yield. In such a configuration, a load applied to the multilayer film can be received by the elastomer when the film is flexed and it is useful for dispersing a load applied locally to the resin composition layer. Particularly, by arranging an elastomer layer adjacent to a resin composition layer, it is possible to disperse and absorb load efficiently. It is more desirable that elastomer layers are arranged on both sides of a layer of the resin composition of the present invention. This makes it possible to reduce damage of the resin composition layer efficiently even when being flexed in any directions. When being laminated with an elastomer, the flexibility of the entire laminated film is not affected very much because the elastomer itself has a low elastic modulus.

Although the elastomer used here is not particularly restricted, a thermoplastic elastomer is preferably used because of, for example, the ease of its molding. As the thermoplastic elastomer, thermoplastic polyurethane, thermoplastic styrene-based elastomers, thermoplastic polyester elastomers, thermoplastic polyamide elastomers, etc. are preferably used. Further, when water resistance or moisture proofing property is required depending on the intended use, it is desirable to be laminated with polyolefin, polyester, polystyrene, etc. When heat sealability is required, it is desirable to be laminated with a polyolefin.

For example, specific examples of the constitution of the multilayer film of the present invention having a resin composition layer and an elastomer layer include elastomer/resin composition, elastomer/resin composition/heat-sealable resin, elastomer/resin composition/elastomer/heat-sealable resin, and waterproof resin/elastomer/resin composition/elastomer/heat-sealable resin. An adhesive resin may be interposed between these layers. The thickness of elastomer layers in not particularly limited, but it is typically from 5 to 200 μm. When the thickness is greater than 200 μm, the weight may become too large. Therefore the thickness is preferably not more than 100 μm, more preferably not more than 50 μm, even more preferably not more than 40 μm, and particularly preferably not more than 30 μm. On the other hand, when the thickness is less than 5 μm, it becomes difficult to produce films and the effect of improving the flex resistance of a multilayer film tends to become insufficient. Therefore, the thickness is preferably 10 μm or more. The overall thickness of a multilayer film is typically from 20 to 300 μm. When the thickness is greater than 300 μm, the flex resistance may deteriorate and therefore it is preferably not more than 200 μm, and more preferably not more than 100 μm. On the other hand, when the thickness is less than 20 μm, it becomes difficult to produce films and the strength tends to become insufficient.

The applications of such monolayer films and multilayer films are not particularly restricted. They can be used suitably for applications where barrier properties, and flex resistance and impact resistance at low temperature are required. For example, a flexible container comprising the multilayer film is a particularly desirable application. Specific examples of particularly suitable applications include bag-in-box for chilled transport of liquid such as drinks filled therein, and pouches to be frozen or refrigerated.

EXAMPLES

The present invention is described in more detail with reference to Examples below.

Synthesis Example 1

Synthesis of Styrene-hydrogenated Butadiene-styrene Triblock Copolymer (f-1) Having a Boronic Acid Ester Group The styrene-hydrogenated butadiene-styrene triblock copolymer (weight average molecular weight=100400, styrene/hydrogenated butadiene=18/82 (weight ratio), 1,2-bond/1,4-bond molar ratio of butadiene units=47/53, a hydrogenation ratio of butadiene units of 97%, double bond amount: 430 μeq, melt index: 5 g/10 min (230° C., 2160 g load), density: 0.89 g/cm³) was fed to a co-rotating twin-screw extruder TEM-35β (manufactured by Toshiba Machine Co., Ltd.) at a rate of 7 kg/hour while ventilating the feed port using 1 L/min nitrogen. Subsequently, while feeding a mixed solution of borane-triethylamine complex (TEAB) and boric acid 1,3-butanediol ester (BBD) (TEAB/BBD=29/71, weight ratio) from a liquid feeder 1 at a rate of 0.6 kg/hour and 1,3-butanediol from a liquid feeder 2 at a rate of 0.4 kg/hour, melt-kneading was carried out continuously. During the kneading, the pressure was regulated so that the gauges at a vent 1 and a vent 2 indicated about 20 mmHg. As the result, a triblock copolymer (f-1) containing boronic acid 1,3-butanediol ester group (BBDE) was obtained from the discharge port at a rate of 7 kg/hour. The content of boronic acid 1,3-butanediol ester groups of this copolymer was 210 µeq/g. The Young's modulus thereof at 23° C., 50% RH was within the range from 1 to 4 MPa. The oxygen transmission rate at 20° C., 65% RH was 4000 cc·20 µm/m²·day·atm.

The constitution of the twin-screw extruder used for the reaction and the conditions under which the extruder was operated are as follows:

Screw diameter: 37 mm φ
L/D: 52 (15 blocks)
Liquid feeder: C3 (Liquid feeder 1), C11 (Liquid feeder 2)
Vent position: C6 (Vent 1), C14 (Vent 2)
Constitution of screw: Seal rings were used between C5 and C6, between C10 and C11, and at C12.
Temperature setting: C1 cooled with water
C2 to C3 200° C.
C4 to C15 250° C.
Die 250° C.
Screw rotation speed: 400 rpm Synthesis Example 2

Preparation of Very Low Density Polyethylene (f-2) having an Ethylene Glycol Boronate Group at an End Thereof An object product (f-2) was obtained by using a very low density polyethylene {MFR: 17 g/10 min (210° C., 2160 g load), density: 0.89 g/cm³, terminal double bond amount: 0.048 meq/g} instead of the styrene-hydrogenated butadiene-styrene triblock copolymer. The amount of boronic acid 1,3-butanediol ester groups of this modified resin was 48 µeq/g. The Young's modulus thereof at 23° C., 50% RH was within the range from 30 to 50 MPa. The oxygen transmission rate at 20° C., 65% RH was 4000 cc·20 µm/m²·day·atm.

Synthesis Example 3

Synthesis of Modified Ethylene-vinyl Alcohol Copolymer (c-1)

Into a polyethylene bag, introduced was 5 kg of pellets of an EVOH having an ethylene content of 44 mol %, a degree of saponification of 99.8%, an intrinsic viscosity of 0.096 L/g and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Then, an aqueous solution was prepared by dissolving 27.44 g (0.125 mol) of zinc acetate dihydrate and 15 g (0.1 mol) of trifluoromethanesulfonic acid in 500 g of water. The aqueous solution was added to the EVOH in the bag. The EVOH to which a catalyst solution had been added in the way described above was heated at 90° C. for 5 hours under occasional shaking with the bag closed. Thus the EVOH was impregnated with the catalyst solution. The resulting EVOH was dried at 90° C. under vacuum to obtain an EVOH including a catalyst (D) containing zinc ion.

As the EVOH (A), used as a blend obtained by dry blending 10 parts by weight of the EVOH including a catalyst (D) containing zinc ion to 90 parts by weight of the EVOH having an ethylene content of 44 mol %, a degree of saponification of 99.8% and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Moreover, epoxypropane was used as a monovalent epoxy compound (B) having a molecular weight of 500 or less.

Using a TEM-35βS extruder (37 mmφ, L/D=52.5) manufactured by Toshiba Machine Co., Ltd., a screw constitution, vents and compression inlets were arranged as shown in FIG. 1. Barrel C1 was cooled with water. Barrels C2-C3 were set at 200° C. and barrels C4-C15 were set at 220° C. The extruder was operated at a screw rotation speed of 200 rpm. The EVOH (A) comprising the dry blended mixture and containing the catalyst (D) was fed from a resin feed inlet C1 at a rate of 11 kg/hr. Then, the inner pressure at a vent 1 was reduced to 60 mmHg epoxypropane was fed through a compression inlet 1 of C8 at a rate of 2.5 kg/hr (pressure during the feed: 3.5 MPa). The inner pressure at a vent 2 was reduced to 200 mmHg to remove unreacted epoxypropane. An aqueous trisodium ethylenediaminetetraacetate trihydrate solution of a concentration of 8.2% by weight was added through a compression inlet 2 of C13 at a rate of 0.14 kg/hr.

The mixing ratio of the monovalent epoxy compound (B) during the melt-kneading operation was 22.7 parts by weight per parts by weight of the EVOH (A). The catalyst (D) was added in an amount of 2.5 µmol/g in terms of molar number of metal ion based on the weight of the EVOH (A). The ratio (E/D) of the molar number of the catalyst deactivator (E) to the molar number of the metal ion contained in the catalyst (D) was 1.

The inner pressure at a vent 3 was reduced to 20 mmHg and the moisture was thereby removed. Thus, a modified EVOH (c-1) was obtained. The above-mentioned modified EVOH (c-1) obtain had an MFR of 5 g/10 min (at 190° C. under a load of 2160 g) and a melting point of 109° C. The zinc ion content was 150 ppm (2.3 µmol/g) and the alkali metal salt content was 168 ppm (7.1 µmol/g) in terms of metal elements [sodium: 160 ppm (6.9 µmol/g); potassium: 8 ppm (0.2 µmol/g)]. The trifluoromethanesulfonic acid ion content was 270 ppm (1.8 µmol/g). The alkali metal ion content was 3.9 times (in molar ratio) the trifluoromethanesulfonic acid ion content.

The chemical structure of the thus obtained modified EVOH (c-1) modified with epoxypropane was determined by trifluoroacetylating the modified EVOH (c-1) by the procedures disclosed in WO 02/092643 A1 (Patent Reference 2) and then subjecting it to NMR measurement. The modified EVOH (c-1) prepared in Synthesis Example 3 had an ethylene content of 44 mol % and structural unit (I) content of 8 mol %. The Young's modulus thereof at 23° C., 50% RH was 1000 MPa, and the oxygen transmission rate thereof at 20° C., 65% RH was 10 cc·20 µm/m²·day·atm.

Synthesis Example 4

Into a polyethylene bag, introduced was 5 kg of pellets of an EVOH having an ethylene content of 32 mol %, a degree of saponification of 99.8%, an intrinsic viscosity of 0.096 L/g and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Then, an aqueous solution was pre pared be dissolving 27.44 g (0.125 mol) of zinc acetate dihydrate and 15 g (0.1 mol) of trifluoromethanesulfonic acid in 500 g of water. The aqueous solution was added to the EVOH in the bag. The EVOH to which a catalyst solution had been added in the way described above was heated at 90° C. for 5 hours under occasional shaking with the bag closed. Thus the EVOH was impregnated with the catalyst solution. The resulting EVOH was dried at 90° C. under vacuum to obtain an EVOH including a catalyst (D) containing zinc ion.

As the EVOH (A), used was a blend obtained by dry blending 10 parts by weight of the EVOH including a catalyst (D) containing zinc ion to 90 parts by weight of the EVOH having an ethylene content of 32 mol %, a degree of saponification of 99.8% and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Moreover, epoxypropane was used as a monovalent epoxy compound (B) having a molecular weight of 500 or less.

Using a TEM-35βS extruder (37 mmφ, L/D=52.5) manufactured by Toshiba Machine Co., Ltd., a screw constitution, vents and compression inlets were arranged as shown in FIG. 1. Barrel C1 was cooled with water. Barrels C2-C3 were set at 200° C. and barrels C4-C15 were set at 220° C. The extruder was operated at a screw rotation speed of 200 rpm. EVOH (A) comprising the dry blended mixture and containing the catalyst (D) was fed from a resin feed inlet of C1 at a rate of 11 kg/hr. Then, the inner pressure at a vent 1 was reduced to 60 mmHg and epoxypropane was fed through a compression inlet 1 of C8 at a rate of 2.5 kg/hr (pressure during the feed: 3.5 MPa). The inner pressure at a vent 2 was reduced to 200 mmHg to remove unreacted epoxypropane. An aqueous trisodium ethylenediaminetetraacetate trihydrate solution of a concentration of 8.2% by weight was added through a compression inlet 2 of C13 at a rate of 0.14 kg/hr.

The mixing ratio of the monovalent epoxy compound (B) during the melt-kneading operation was 22.7 parts by weight per 100 parts by weight of the EVOH (A). The catalyst (D) was added in an amount of 2.5 μmol/g in terms of molar number of metal ion based on the weight of the EVOH (A). The ration (E/D) of the molar number of the catalyst deactivator (E) to the molar number of the metal ion contained in the catalyst (D) was 1.

The inner pressure at a vent 3 was reduced to 20 mmHg and the moisture was thereby removed. Thus, a modified EVOH (c-2) was obtained. The above-mentioned modified EVOH (c-2) obtained had an MFR of 5 g/10 min (at 190° C. under a load of 2160 g) and a melting point of 133° C. The zinc ion content was 150 ppm (2.3 μmol/g) and the alkali metal salt content was 168 ppm (7.1 μmol/g) in terms of metal elements [sodium: 160 ppm (6.9 μmol/g); potassium: 8 ppm (0.2 μmol/g)]. The trifluoromethanesulfonic acid ion content was 270 ppm (1.8 μmol/g). The alkali metal ion content was 3.9 times (in molar ratio) the trifluoromethanesulfonic acid ion content.

The chemical structure of the thus obtained modified EVOH (c-2) modified with epoxypropane was determined in the same manner as Synthesis Example 3. The resulting modified EVOH (c-2) had an ethylene content of 32 mol % and a structural unit (I) content of 8 mol %. The Young's modulus thereof at 23° C., 50% RH was 1200 MPa, and the oxygen transmission rate thereof at 20° C., 65% RH was 4 cc·20 μm/m²·day·atm.

Synthesis Example 5

A modified EVOH (c-3) was obtained in the same manner as Synthesis Example 3 except for changing the feeding rate of epoxypropane to 3.75 kg/hr. The above-mentioned modified EVOH (c-3) obtained had an MFR of 5.0 g/10 min (at 190° C. under a load of 2160 g) and a melting point of 90° C. In addition, the zinc ion content was 200 ppm (3.1 μmol/g) and the alkali metal salt content in terms of metal elements was 218 ppm (9.2 μmol/g) [sodium: 210 ppm (9.0 μmol/g); potassium: 8 ppm (0.2 μmol/g)]. The trifluoromethanesulfonic ion content was 350 ppm (2.3 μmol/g). The content of alkali metal ion was 4 times (in molar ratio) the content of trifluoromethanesulfonic ion. The chemical structure was determined in the same manner as Synthesis Example 3. The resulting modified EVOH (c-3) had an ethylene content of 44 mol % and a structural unit (I) content of 11 mol %. The Young's modulus thereof at 23° C., 50% RH was 800 MPa. The oxygen transmission rate at 20° C., 65% RH was 15 cc·20 μm/m²·day·atm.

The resins used in the following Examples including the resins synthesized above are summarized in Table 1.

Example 1

1 g of the modified styrene-hydrogenated butadiene-styrene triblock copolymer (f-1) obtained in Synthesis Example 1 and 4 g of the modified ethylene-vinyl alcohol copolymer (c-1) obtained in Synthesis Example 3 were charged into a twin-screw vented extruder and subjected to extrusion pelletization at 220° C. Thus, resin composition pellets were obtained. The resin composition obtained were subjected to the following evaluations. The evaluation results are shown collectively in Table 2.

(1) Average Particle Diameter

A molded article used in the test provided in the following "(5) Impact strength" was used. A fractured section of the molded article was immersed in toluene at 100° C. to dissolve and remove soft resin (F) exposed, and then the fractured section was observed by use of a scanning electron microscope. Diameters of particles of soft resin (F) were measured in a photograph of the fractured section and the arithmetic average of the particle diameters measured was used as an average particle diameter. The observation was conducted at up to 5000 magnifications. When the particle diameter was less than 0.1 μm, no particles were recognized in a photograph and such a case was indicated as "<0.1" in Table 2 without determination of a average particle diameter. In a case of only one component, measurement was not conducted and such a case was indicated as "-" in Table 2.

(2) Tensile Elongation at Yield

Using the pellets obtained, a monolayer film was made by use of a machine shown below.
  Machine used: twin screw extruder manufactured by Toyo Seiki Seisaku-Sho, Ltd.
  Screw: 20 mmφ, full flight
  Extrusion temperature: 200/200/200/200° C.
  Film thickness: 20 μm Using the resulting monolayer film, a 15 mm wide strip-shaped section was prepared. This was left at rest for one hour under 0° C. atmosphere and was used as a sample for test. In a 0° C. thermostatic chamber, an S-S curve (stress-strain curve) at 0° C. was measured under conditions of a chuck span of 50 mm and a tensile speed of 500 mm/min using an autograph (Model AG-A500) manufactured by Shimadzu Corp. In the S-S curve, the inflection point of the lowest elongation was defined as a yield point and the elongation (%) thereof was read.

(3) Young's Modulus

Using the 20 μm thick monolayer film obtained in the "(2) Tensile elongation at yield" described above, a 15 mm wide strip-shaped section was prepared. In a thermostatic chamber at 23° C. and 50% RH, an S-S curve (stress-strain curve) at 23° C. and 50% RH was measured under conditions of a chuck span of 50 mm and a tensile speed of 50 mm/min using an "Autograph (Model AG-A500)" manufactured by Shimadzu Corp. A Young's modulus was calculated from the initial inclination of the S-S curve.

(4) Flex Resistance

Measurement was conducted using the monolayer film obtained in the "(2) Tensile elongation at yield" described above. In a 0° C. thermostatic chamber, flexing was repeated by use of a Gelbo Flex Tester manufactured by Rigaku Kogyo Co., Ltd. while changing the number of flexures. For each number of flexures, the pinholes formed were counted. The above measurement results were plotted with numbers of flexures (P) as abscissa against numbers of pinholes (N) as ordinate. The number of flexures at which one pinhole is formed (Np1) was determined by extrapolation.

(5) Impact Strength

Using the pellets obtained, a specimen was prepared by injection molding. The Izod impact strength thereof was measured at −40° C. in accordance with ASTM D256. An impact strength analyzer was placed in a thermostatic chamber adjusted to −40° C. A sample to be measured was stored in the thermostatic chamber at least overnight before measurement and then the impact strength thereof was measured at −40° C.

(6) Oxygen Transmission Rate

A multilayer film was prepared by dry lamination of a 50 μm thick CPP film to the 20 μm thick monolayer film obtained in the "(2) Tensile elongation at yield" described above using an adhesive AD-335β (produced by Toyo-Morton, Ltd.) and the oxygen transmission rate thereof (cc·20 μm/m²·day·atm) at 20° C., 65% RH was measured by use of an OXTRAN 2/20β manufactured by Modern Control, Inc.

Examples 2 to 5

Pellets of a resin composition were obtained in the same manner as Example 1 except for changing the kind and amount of the resin used as shown in Table 2, followed by evaluations in the same manners as Example 1. The evaluation results are shown collectively in Table 2.

Example 6

Pellets of a resin composition were obtained in the same manner as Example 3 except for using "TUFTEC M1943" (f-3) produced by Asahi Kasei Corp. as soft resin (F). "TUFTEC M1943" is a maleic anhydride modification product of a styrene-hydrogenated butadiene-styrene block copolymer, which had a styrene content of 20% by weight and an amount of maleic anhydride modification of 180 μeq/g. The Young's modulus at 23° C., 50% RH of "TUFTEC M1943" was within the range from 1 to 4 MPa, and the oxygen transmission rate at 20° C., 65% RH was 4000 cc·20 μm/m²·day·atm. Using the pellets obtained, evaluations were conducted in the same manners as Example 1. The evaluation results are shown collectively in Table 2.

Comparative Example 1

An EVOH produced by Kuraray Co., Ltd. "EVAL (registered trademark)-F101" (an ethylene content of 32 mol %, a degree of saponification of 99.5% and an intrinsic viscosity of 1.1 dl/g) (a-1) and the modified styrene-hydrogenated butadiene-styrene triblock copolymer (f-1) obtained in Synthesis Example 1 were charged into a twin-screw vented extruder and subjected to extrusion pelletization at 220° C. Thus, resin composition pellets were obtained. The Young's modulus at 23° C., 50% RH of EVOH (a-1) was 2000 Mpa, and the oxygen transmission rate at 20° C., 65% RH was 0.14 cc·20 μm/m²·day·atm. Using the pellets obtained, evaluations were conducted in the same manners as Example 1. The evaluation results are shown collectively in Table 2.

Comparative Example 2

An EVOH produced by Kuraray Co., Ltd. "EVAL (registered trademark)-E105" (an ethylene content of 44 mol %, a degree of saponification of 99.8% and an intrinsic viscosity of 0.096 L/g) (a-2) and the modified styrene-hydrogenated butadiene-styrene triblock copolymer (f-1) obtained in Synthesis Example 1 were charged into a twin-screw vented extruder and subjected to extrusion pelletization at 220° C. Thus, resin composition pellets were obtained. The Young's modulus at 23° C., 50% RH of EVOH (a-2) was 1700 Mpa, and the oxygen transmission rate at 20° C., 65% RH was 1.2 cc·20 μm/m²·day·atm. Using the pellets obtained, evaluations were conducted in the same manners as Example 1. The evaluation results are shown collectively in Table 2.

Comparative Example 3

Pellets of a resin composition were obtained in the same manner as Example 2 except for using an unmodified styrene-hydrogenated butadiene-styrene triblock copolymer (weight average molecular weight=100400, styrene/hydrogenated butadiene=18/82 (weight ratio), 1,2-bond/1,4-bond molar ratio of butadiene units=47/53, hydrogenation ratio of butadiene units=97%, double bond amount=430 μeq/g, melt index=5 g/10 min (230° C., 2160 g load), density=0.89 g/cm³) (f-4) as a soft resin (F). The Young's modulus at 23° C., 50% RH of the triblock copolymer (f-4) was within the range from 1 to 4 MPa, and the oxygen transmission rate at 20° C., 65% RH was 4000 cc·20 μm/m²·day·atm. Using the pellets obtained, evaluations were conducted in the same manners as Example 1. The evaluation results are shown collectively in Table 2.

Comparative Examples 4 to 9

Using the pellets shown in a table solely, evaluations were conducted in the same manners as Example 1. The evaluation results are shown collectively in Table 2. It is noted that average particle diameters were not measured. For Comparative Examples 7 to 9, which used a soft resin (F) solely, no specific values are shown in Table 2 because the elongations at yield are all greater than 100%.

TABLE 1

|  |  | Oxygen transmission rate (cc · 20 μm/m² · day · atm) (20° C., 65% RH) | Young's modulus (MPa) (23° C., 50% RH) |
|---|---|---|---|
| a-1 | EVOH (ethylene content = 32 mol %) | 0.14 | 2000 |
| a-2 | EVOH (ethylene content = 44 mol %) | 1.2 | 1700 |
| c-1 | Modified EVOH (ethylene content = 44 mol %, structural unit (I) content = 8 mol %) | 10 | 1000 |
| c-2 | Modified EVOH (ethylene content = 32 mol %, structural unit (I) content = 8 mol %) | 4 | 1200 |
| c-3 | Modified EVOH (ethylene content = 44 mol %, structural unit (I) content = 11 mol %) | 15 | 800 |
| f-1 | Boronic acid ester group-containing styrene-hydrogenated diene block copolymer (functional group content = 210 μeq/g) | 4000 | 1-4 |
| f-2 | Boronic acid ester group-containing VLDPE (functional group content = 48 μeq/g) | 4000 | 30-50 |
| f-3 | Maleic anhydride modified styrene-hydrogenated diene block copolymer (functional group content = 180 μeq/g) | 4000 | 1-4 |
| f-4 | Unmodified styrene-hydrogenated diene block copolymer | 4000 | 1-4 |

TABLE 2

|  | EVOH (C or A) | Soft resin (F) | Ratio (C/F or A/F) | Average particle diameter μm | Tensile elongation at yield % | Flex resistance times | Impact strength kJ/m² | Oxygen transmission rate cc 20 μm/m² · day · atm |
|---|---|---|---|---|---|---|---|---|
| Example 1 | c-1 | f-1 | 80/20 | <0.1 | 18 | 70 | 30 | 15 |
| Example 2 | c-2 | f-1 | 80/20 | <0.1 | 16 | 50 | 26 | 6 |
| Example 3 | c-3 | f-1 | 80/20 | <0.1 | 20 | 150 | 40 | 20 |
| Example 4 | c-3 | f-1 | 90/10 | <0.1 | 15 | 100 | 30 | 17 |
| Example 5 | c-3 | f-2 | 80/20 | <0.1 | 20 | 150 | 38 | 20 |
| Example 6 | c-3 | f-3 | 80/20 | <0.1 | 20 | 150 | 38 | 20 |
| Comparative Example 1 | a-1 | f-1 | 80/20 | 0.3 | 6 | 40 | 22 | 1 |
| Comparative Example 2 | a-2 | f-1 | 80/20 | 0.2 | 6 | 50 | 25 | 3 |
| Comparative Example 3 | c-2 | f-4 | 80/20 | 5 | 6 | 8 | 3 | 10 |
| Comparative Example 4 | a-1 | None | 100/0 | — | 3 | 1 | 2.4 | 0.4 |
| Comparative Example 5 | c-2 | None | 100/0 | — | 4 | 5 | 3.9 | 4 |
| Comparative Example 6 | c-3 | None | 100/0 | — | 5 | 10 | 4 | 15 |
| Comparative Example 7 | None | f-1 | 0/100 | — | >100 | >500 | >50 | 4000 |
| Comparative Example 8 | None | f-2 | 0/100 | — | >100 | >500 | >50 | 4000 |
| Comparative Example 9 | None | f-3 | 0/100 | — | >100 | >500 | >50 | 4000 |

As shown in Table 2, in the resin compositions of Examples 1 to 6 comprising a modified EVOH (C) containing structure units (I) and a soft resin (F) having functional groups able to react with a hydroxyl group, the average particle diameters were less than 0.1 μm. On the other hand, in Comparative Examples 1 and 2, in which unmodified EVOHs were used, and in Comparative Example 3, in which an unmodified soft resin was used, the average particle diameters are all far larger and it is therefore shown that it is possible to produce a very fine dispersion by combining a modified EVOH (C) and a soft resin (F).

An unmodified EVOH had an elongation at yield at 0° C. of 3% (Comparative Example 4). The modified EVOHs (C) resulting from introduction of structural units (I) to that resin had elongations at yield of 4 to 5% (Comparative Examples 5 and 6), which slightly increased. The resin compositions resulting from blending a soft resin (F) having functional groups able to react with a hydroxyl group to an unmodified EVOH had an elongation at yield of 6% (Comparative Examples 1 and 2), which did not increase very much. Furthermore, the resin composition resulting from blending an unmodified soft resin to a modified EVOH (C) also had an elongation at yield of 6% (Comparative Example 3), which also did not increase very much. In contrast, the resin compositions comprising a modified EVOH (C) containing structural units (I) and a soft resin (F) having functional groups able to react with a hydroxyl group (Examples 1 to 6) had elongations at yield of 15 to 20%, which have greatly increased in comparison to the values of Comparative Examples. In other words, it has become clear that the resin compositions of the present invention have great elongations at yield at low temperature and therefore have elastomer-like properties.

It is shown that the resin compositions disclosed in Examples 1 to 6 are excellent in flex resistance and impact resistance at low temperature and they maintain satisfactory oxygen transmission rates which are not higher than 20 cc·20 μm/m²·day·atm. It is therefore shown that they can be used suitably for various applications where flex resistance or impact resistance is required at low temperature.

The invention claimed is:

1. A resin composition comprising from 50 to 95% by weight of a modified ethylene-vinyl alcohol copolymer (C) that contains from 0.3 to 40 mol % of a structural unit (I) provided below and has an ethylene content of from 5 to 55 mol %, and from 5 to 50% by weight of a resin (F) that is a styrene-diene block copolymer, a hydrogenated product thereof, or an olefin-based copolymer, and that has at least one functional group able to react with a hydroxyl group and has a Young's modulus at 23° C., 50% RH of 500 MPa or less, wherein the resin (F) is dispersed with an average particle diameter of 0.1 μm or less in a matrix of the modified ethylene-vinyl alcohol copolymer (C), and wherein the resin composition has an oxygen transmission rate at 20° C., 65% RH of not more than 100 cc·20 μm/m²·day·atm,:

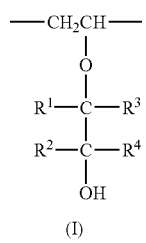

[Chem. 1]

wherein $R^1$, $R^2$, $R^3$ and $R^4$ denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ; $R^3$ and $R^4$ may be combined together; and $R^1$, $R^2$, $R^3$ and $R^4$ each may have a hydroxyl group, a carboxyl group or a halogen atom.

2. The resin composition according to claim 1, wherein the tensile elongation at yield of the resin composition measured in a tensile strength/elongation measurement at 0° C. is from 8 to 30%.

3. The resin composition according to claim 1, wherein the Izod impact strength at −40° C. of the resin composition measured in accordance with ASTM D265 is from 25 to 60 kJ/m².

4. The resin composition according to claim 1, wherein the resin (F) is a resin modified with maleic acid or maleic anhydride.

5. The resin composition according to claim 1, wherein the resin (F) has a boronic acid group or a boron-containing group capable of being converted into a boronic acid group in the presence of water.

6. The resin composition according to claim 1, wherein the resin (F) is a styrene-diene block copolymer or a hydrogenated product thereof.

7. The resin composition according to claim 1, wherein the resin (F) is an olefin-based copolymer.

8. A film comprising the resin composition according to claim 1.

9. A multilayer film, wherein a film of an elastomer is laminated on at least one side of the film according to claim 8.

10. A flexible container comprising the multilayer film according to claim 9.

11. The resin composition according to claim 1, wherein the ethylene-vinyl alcohol copolymer (C) is present in an amount of from 60 to 90% by weight and the resin (F) is present in an amount of from 10 to 40% by weight.

12. The resin composition according to claim 1, wherein the ethylene-vinyl alcohol copolymer (C) is present in an amount of from 70 to 85% by weight and the resin (F) is present in an amount of from 15 to 30% by weight.

13. A resin composition comprising from 50 to 95% by weight of a modified ethylene-vinyl alcohol copolymer (C) obtained by reacting an ethylene-vinyl alcohol copolymer (A) with a monovalent epoxy compound (B) having a molecular weight of 500 or less, and from 5 to 50% by weight of a resin (F) that is a styrene-diene block copolymer, a hydrogenated product thereof, or an olefin-based copolymer, and that has at least one functional group able to react with a hydroxyl group and has a Young's modulus at 23° C., 50% RH of 500 MPa or less, wherein the resin (F) is dispersed with an average particle diameter of 0.1 μm or less in a matrix of the modified ethylene-vinyl alcohol copolymer (C), and wherein the resin composition has an oxygen transmission rate at 20° C., 65% RH of not more than 100 cc·20 μm/m²·day·atm.

14. The resin composition according to claim 13, wherein the tensile elongation at yield of the resin composition measured in a tensile strength/elongation measurement at 0° C. is from 8 to 30%.

15. The resin composition according to claim 13, wherein the Izod impact strength at −40° C. of the resin composition measured in accordance with ASTM D265 is from 25 to 60 kJ/m².

16. The resin composition according to claim 13, wherein the resin (F) is a resin modified with maleic acid or maleic anhydride.

17. The resin composition according to claim 13, wherein the resin (F) has a boronic acid group or a boron-containing group capable of being converted into a boronic acid group in the presence of water.

18. The resin composition according to claim 13, wherein the resin (F) is a styrene-diene block copolymer or a hydrogenated product thereof.

19. The resin composition according to claim 13, wherein the resin (F) is an olefin-based copolymer.

20. A film comprising the resin composition according to claim 13.

21. A multilayer film, wherein a film of an elastomer is laminated on at least one side of the film according to claim 20.

22. A flexible container comprising the multilayer film according to claim 21.

23. The resin composition according to claim 13, wherein the ethylene-vinyl alcohol copolymer (C) is present in an amount of from 60 to 90% by weight and the resin (F) is present in an amount of from 10 to 40% by weight.

24. The resin composition according to claim 13, wherein the ethylene-vinyl alcohol copolymer (C) is present in an amount of from 70 to 85% by weight and the resin (F) is present in an amount of from 15 to 30% by weight.

* * * * *